United States Patent Office 3,149,087
Patented Sept. 15, 1964

3,149,087
PLASTICIZED HALOGEN-CONTAINING RESINS
Constantine E. Anagnostopoulos, Kirkwood, and Albert J. Lauck, Webster Groves, Mo., assignors to Monsanto Company, a corporation of Delaware
No Drawing. Filed Nov. 8, 1961, Ser. No. 150,894
30 Claims. (Cl. 260—31.6)

This invention relates to new and useful compositions comprising halogen-containing vinyl resins and relates more particularly to compositions comprising halogen-containing vinyl resins plasticized with low molecular weight, terminated, unsaturated polyesters. The invention has special utility for the production of halogen-containing vinyl resin plastisols, organosols and dry blends wherein said polyesters function effectively as polymerizable plasticizers which significantly improve certain physical properties of the starting resin.

Halogen-containing vinyl resins such as polyvinyl chloride and its copolymers, which are widely employed in the plastics industry, are generally hard and brittle in their unplasticized state. Although unplasticized polyvinyl chloride has an indefinite flexibility point of approximately 75 to 80° C., the unplasticized resins do not become fused, fluid, pliable, mobile or workable up to temperatures of 165–175° C. Moreover because of the fact that these polyvinyl resins do not have definite fusion points and do not become fluid at temperatures below their decomposition temperatures, the unplasticized resins cannot be processed by wet-milling, extruding or molding, and particularly, these materials cannot be used for rotational casting techniques.

To overcome many of these difficulties it is common practice to intimately mix polyvinyl chloride resins with plasticizing compounds such as dioctyl phthalate and tricresyl phosphate. Such plasticized compositions are easily and readily worked on roll mills, and films and sheets formed therefrom are supple and flexible, these characteristics being desirable for many applications. Said compositions may also be readily molded or extruded, although the molded or extruded articles possess a softness, flexibility or non-rigidity which are undesirable in this type of article. In many applications it is desirable to use resin compositions prepared by conventional formulation methods, which upon fusion and curing result in hard and rigid finished articles.

It is an object of this invention to provide improved halogen-containing vinyl resin compositions.

A further object is to provide novel plastic compositions comprising halogen-containing resins and certain low molecular weight, terminated, unsaturated polyesters.

A still further object of this invention is to provide new polymerizable plasticizers for vinyl chloride polymers and copolymers.

Another object is to provide new resin compositions which may be easily prepared by conventional formulation methods and which, upon fusion and curing, result in a hard, rigid material.

Further objects will be apparent to those skilled in the art from the following description and claims.

In accordance with this invention it has been found that a resinous composition comprising a halogen-containing vinyl resin and, as a polymerizable plasticizer, a low molecular weight, terminated, unsaturated polyester of the type hereinafter described, may be fused and cured to a hard and rigid material. The aforementioned compositions are prepared in a well known manner. The resinous composition, upon molding and curing, results in a hard and rigid material.

Generally speaking, about 5 to 200 parts of plasticizer may be used for each 100 parts of halogen-containing vinyl resin. However, it is preferred to use from about 50 to 80 parts of plasticizer per 100 parts of resin.

This invention is particularly applicable to polymerized vinyl chloride resins and to resins formed by the conjoint polymerization of vinyl chloride with other materials such as vinyl acetate, vinyl propionate, vinylidene chloride, methyl methacrylate or diethyl maleate, preferably wherein vinyl chloride comprises at least 70% of the copolymer resin.

In order to facilitate the curing of the polymerizable plasticizer in the resin within a practicable time, it is preferred to incorporate from about 0.5% to 5% of a polymerization catalyst, based on the weight of the polymerizable plasticizer. While any of the usual peroxy polymerization catalysts such as benzoyl peroxide, acetyl peroxide, succinyl peroxide, methyl ethyl ketone peroxide, cumene hydroperoxide, t-butyl hydroperoxide, perbenzoic acid, peracetic acid and chlorine substituted aryl peroxides are effective, it is preferred to use t-butyl perbenzoate or benzoyl peroxide.

The usual heat stabilizers and light stabilizers for the resin may also be present in the resinous composition as indicated in the examples below. Fillers and coloring materials well known to those familiar with the art may also be added to the resin if desired.

The polymerizable plasticizers which are employed in the practice of this invention are low molecular weight, terminated, unsaturated polyesters. Such polyesters comprise the residues of a dihydroxy aliphatic compound of from 2 to 6 carbon atoms, a mono-olefinically unsaturated, aliphatic dicarboxylic acid of from 4 to 5 carbon atoms and a saturated, aliphatic dicarboxylic acid of from 4 to 10 carbon atoms, said polyester being terminated with a residue selected from the residues of mono-carboxylic saturated and unsaturated aliphatic acids of from 6 to 20 carbon atoms, benzoic acid, naphthoic acid, saturated aliphatic alcohols of from 4 to 20 carbon atoms and phenylalkyl and phenoxyalkyl alcohols of from 7 to 10 carbon atoms. The average molecular weight of such polyesters is less than 4000. The ratio of saturated, dicarboxylic acid residue to unsaturated, dicarboxylic acid residue can vary from 1:3 to 8:1.

As employed in this application, the phrase "residue of a dicarboxylic acid" designates the divalent radical

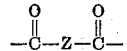

which results from the removal of the hydroxyl group from each of the carbonyl carbon atoms. As employed in this application, the phrase "residue of a dihydroxy aliphatic compound" designates the divalent radical

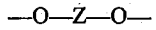

which results from the removal of both of the hydroxyl hydrogen atoms. In each of these radicals Z represents a divalent, aliphatic linking radical. As employed in this application, the phrase "residue of a monocarboxylic acid" designates the monovalent radical

which results from the removal of the hydroxyl group from the carbonyl carbon atom. As employed in this application, the phrase "residue of an alcohol" designates the monovalent radical Y'— which results from the removal of the hydroxyl group.

The dihydroxy aliphatic compounds which are suitable for use in preparing the polyester plasticizers of this invention include the alkylene glycols such as ethylene glycol, 1,2-propanediol, 1,3-propanediol, 2-methyl-2-ethyl-1,3-propanediol, 1,2-butanediol, 1,3-butanediol, 1,4-butanediol, 2,3-butanediol, 2,2-dimethylpropane-1,3-diol, 1,4-pentanediol, 1,6-hexanediol, 2-methyl-2,4-pentanediol and the like, and the polyalkylene glycols such as diethylene glycol, triethylene glycol and dipropylene glycol.

The mono-olefinically unsaturated dicarboxylic acids which are suitable for use in preparing the polyester plasticizers of this invention include maleic acid, fumaric acid, itaconic acid and citraconic acid. It will be recognized that the corresponding anhydrides can also be employed since the residues yielded are identical.

The saturated aliphatic dicarboxylic acids which are suitable for use in preparing the polyester plasticizers of this invention include succinic acid, glutaric acid, adipic acid, pimelic acid, suberic acid, azelaic acid and sebacic acid.

The monocarboxylic acids which are suitable as terminators for the polyester plasticizers of this invention include the saturated acids such as caproic, enanthic, caprylic, pelargonic, capric, undecanoic, lauric, myristic, palmitic, stearic, arachidic and the like, the unsaturated acids such as decylenic, palmitoleic, oleic, linoleic and the like, and the aromatic acids such as benzoic and naphthoic.

The alcohols which are suitable as terminators for the polyester plasticizers of this invention include the saturated aliphatics such as n-butyl alcohol, t-butyl alcohol, isoamyl alcohol, neopentyl alcohol, n-hexyl alcohol, n-octyl alcohol, n-nonyl alcohol, lauryl alcohol, myristal alcohol, cetyl alcohol, n-eicosyl alcohol and the like; the phenylalkyl alcohols such as benzyl alcohol, phenylethyl alcohol, phenylbutyl alcohol and the like; and the phenoxyalkyl alcohols such as phenoxymethyl alcohol, phenoxybutyl alcohol and the like.

The low molecular weight, terminated, unsaturated polyester plasticizers of this invention are linear in nature. Said polyester can be further characterized by the following general formula

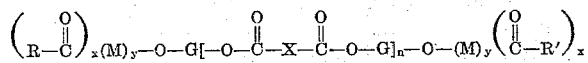

wherein $n$, the theoretical number of recurring units, has an average value of from 2 to 20, each X is selected from the group consisting of saturated aliphatic hydrocarbons of from 2 to 8 carbon atoms and mono-olefinically unsaturated aliphatic hydrocarbons of from 2 to 3 carbon atoms, the ratio of saturated to unsaturated hydrocarbons represented by X being from 1:3 to 8:1, G is selected from the group consisting of alkylene and oxyalkylene of from 2 to 6 carbon atoms, R and R' are each selected from the group consisting of alkyl and alkenyl of from 5 to 19 carbon atoms, phenyl and naphthyl, M is selected from alkyl of 4 to 20 carbons and phenylalkyl and phenoxyalkyl of from 7 to 10 carbon atoms, and $x$ and $y$ are unlike integers selected from 0 and 1. As employed herein, the term "oxyalkylene" designates the divalent ether group which forms the central portion of a polyalkylene glycol such as —$CH_2$—O—$CH_2$— in diethylene glycol.

Within the general formula given above, a particularly preferred group of polyesters are those wherein $n$ has an average value of from 6 to 16, each X is selected from —$(CH_2)_4$— and —CH=CH—, the ratio of —$(CH_2)_4$— to —CH=CH— is from 1:2 to 3:1, G is alkylene of from 2 to 6 carbon atoms, and R and R' are alkyl of from 7 to 17 carbon atoms. Such preferred polyesters display the most desirable properties and are most readily prepared in view of the availability of starting materials.

Thus it can be seen that the polymerizable plasticizers of this invention are linear polyesters having a chain wherein a mixture of saturated and unsaturated dicarboxylic acid residues are spaced by aliphatic glycol residues, such glycol residues being from a single glycol or from a mixture of glycols. It can also be seen that the monocarboxylic acid residues which terminate said chain can be residues of a single acid or residues of a mixture of acids.

The polyesters of this invention are prepared by charging a reaction vessel with an excess of glycol or glycols, a mixture of saturated and unsaturated dicarboxylic acids (within the ratio set forth above), a terminating monocarboxylic acid, acids or alcohol, and a transesterification catalyst. The mixture is heated to cause esterification and removal of water. The mixture is then heated further under vacuum to propagate the chain and to remove the excess glycol. The following detailed description will more fully illustrate the preparation of the polyesters of this invention.

EXAMPLE I

In a 1 liter three-necked flask equipped with a stirrer, sub-surface carbon dioxide inlet tube, thermometer and a six inch punched column with a condenser was charged 210 grams (2.34 mole) of 1,3-butanediol, 73.05 grams (0.500 mole) of adipic acid, 58.0 grams (0.500 mole) of fumaric acid and 34.4 grams (0.200 mole) of capric acid. The mixture was flushed with a steam of carbon dioxide (20 ml./min.) for 15 minutes. Then four drops (0.0834 gram, $4.39 \times 10^{-4}$ moles) of titanium tetrachloride was added to the mixture, and heat was applied to the flask. At 140–160° C. distillation of water began, and the carbon dioxide flow was regulated to maintain a vapor temperature below 106° C. The reaction temperature was increased to 190–200° C. over a one hour period. After about 38 ml. of water had been collected, the carbon dioxide flow was removed and the system was placed under a vacuum of about 450 mm. maintaining the temperature at 195–200° C. After an additional one-half hour, about 42 ml. of distillate had been collected, indicating that the esterification cycle was complete. The distillate receiver was changed, and vacuum was slowly reduced to 3–4 mm. during an hour and a half period, while the reaction temperature was increased to 210–215° C. At about 300 mm., glycol started distilling from the batch. The vacuum was reduced slowly to prevent ester from distilling over with the glycol. The 3–4 mm. of vacuum was maintained for one-half hour with the reaction temperature at 215° C. Approximately 112 ml. of glycol distillate was collected. The batch was allowed to cool to 125° C. and filtered through filter aid. The yield of polyester was 219.8 grams.

The halogen-containing resins of this invention are those derived from such vinyl compounds as vinyl chloride, vinylidene chloride, vinyl chloroacetate, chlorostyrene, chlorobutadienes, etc. Said resins also include the copolymers of such vinyl compounds and other ethylenically unsaturated monomers copolymerizable therewith. Illustrative are the copolymers of a vinyl halide such as vinyl chloride with such materials as vinylidene chloride, vinyl esters of carboxylic acids, e.g. vinyl acetate, vinyl propionate, vinyl butyrate, vinyl benzoate; esters of unsaturated acids, e.g. alkyl acrylates such as methyl acrylate, ethyl acrylate, propyl acrylate, butyl acrylate, allyl acrylate, and the corresponding esters of methacrylic acid; vinyl aromatic compounds, e.g. styrene, ortho-chlorostyrene, para-chlorostyrene, 2,5-dichlorostyrene, 2,4-dichlorostyrene, para-ethyl styrene, vinyl naphthalene, α-methyl styrene; dienes such as butadiene, chlorobutadiene; unsaturated amides such as acrylic acid amide, acrylic acid anilide; unsaturated nitriles such as acrylic acid nitrile; esters of α,β-unsaturated carboxylic acids, e.g. the methyl, ethyl, propyl, butyl, amyl, hexyl, heptyl, octyl, allyl, methallyl and phenyl esters of maleic, crotonic, itaconic and fumaric acids and the like.

It should be recognized that the halogenated resins containing halogens other than chlorine, e.g. bromine, fluorine and iodine, are also operable in this invention. Said halogenated resins may contain a varying proportion of halogen depending upon the nature of the resin and its contemplated use. Those copolymers in which a predominant portion, i.e., more than 50% by weight of the copolymer is made from a halogen-containing vinyl compound such as vinyl chloride represents a preferred class of polymers to be treated according to this invention.

The polymerizable plasticizers of this invention are not only compatible with the various vinyl resins described above but are also compatible with the known non-polymerizable ester plasticizers commonly employed with such resins. Illustrative of these latter plasticizers are the alkyl and aryl phosphates, the alkyl phthalates, adipates, sebacates and azelates, and the epoxidized vegetable oils. Specific examples of such known plasticizers include tri-(2-ethylhexyl)phosphate, tricresyl phosphate, di-(2-ethylhexyl)phthalate and the corresponding adipate, dioctyl sebacate, and epoxidized soy bean oils.

The polymerizable plasticizers of this invention are also compatible with various unsaturated monomeric compounds which are employed as cross linking agents in resinous compositions. Such monomeric cross linking agents include vinyl compounds such as vinyl benzoate, vinyl crotonate, cyanovinyl acetate, vinyl toluene, divinyl toluene, bis (β-chloroethyl)vinyl phosphonate, butyl vinyl ether, and the like, and polyallyl esters such as diallyl adipate, triallyl citrate, diallyl phthalate, diallyl sebacate, and the like.

Excellent resinous compositions have been made by intimately mixing a halogen-containing vinyl resin with a mixture of a polyester plasticizer and one of the non-polymerizable plasticizers described above. The ratio of polyester to non-polymerizable plasticizer will vary over a wide range depending upon the type of resin and the final properties desired. A major proportion of either plasticizer can be employed.

Resinous compositions have also been prepared with the polyester plasticizers and the monomeric vinyl and polyallyl cross linking agents. In such compositions the ratio of polyester to agent should be at least about 3:2. It is particularly preferred to employ at least a 2:1 ratio of polyester to cross linking agent.

The invention will be more fully understood by reference to the several tables hereinafter presented. However, the preparations set forth in such tables are illustrative only and are not to be construed as limiting the scope of the present invention in any manner.

Table I lists a number of polyesters prepared in accordance with the procedures detailed in Example I. The specific reactants, the average number of recurring units ($n$ in the formula above) and the ratios of reactants, where appropriate, are given.

*Table I*

| Polyester | Glycol | Dicarboxylic acids | | | Terminating acid(s) | Average number of recurring units |
|---|---|---|---|---|---|---|
| | | Saturated | Unsaturated | Ratio of s:u | | |
| A | 1,2-propylene | Adipic | Maleic | 5.7:1 | Stearic and oleic [1] | 13 |
| B | do | do | do | 5.7:1 | Palmitic and oleic [2] | 13 |
| C | do | do | do | 3:1 | Capric | 8 |
| D | do | do | Fumaric | 3:1 | do | 8 |
| E | 1,3-butylene | do | Maleic | 2:1 | do | 6 |
| F | do | do | Fumaric | 2:1 | do | 6 |
| G | do | do | Maleic | 2:1 | do | 10 |
| H | do | do | Fumaric | 2:1 | do | 10 |
| I | do | do | Maleic | 2:1 | do | 14 |
| J | do | do | Fumaric | 2:1 | do | 14 |
| K | do | do | Maleic | 1.2:1 | do | 10 |
| L | do | do | do | 3:1 | do | 10 |
| M | do | do | Fumaric | 3:1 | do | 10 |
| N | do | do | do | 2:1 | Myristic | 10 |
| O | do | do | do | 3:1 | Benzoic | 10 |
| P | do | do | do | 5:1 | Myristic | 12 |
| Q | do | do | do | 1:1 | Capric | 6 |
| R | do | do | do | 1:1 | Benzoic | 10 |
| S | do | do | do | 1:2 | do | 6 |
| T | do | do | do | 1:2 | Capric | 10 |
| U | do | do | do | 2:1 | Benzoic | 6 |
| V | do | do | do | 3:1 | Capric | 10 |
| W | do | do | do | 2.5:1 | do | 10 |
| X | do | do | do | 1:1 | do | 10 |

[1] Ratio of stearic to oleic—2:1.
[2] Ratio of palmitic to oleic—1:1.

Resinous compositions were prepared from a halogen-containing vinyl resin and several of the polyesters in Table I. Such compositions are set forth in Table II, all parts being parts by weight. Other components employed in said compositions are also indicated.

Table II

| Components | Composition No. (parts by weight) | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| Polyvinyl chloride | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 |
| Polyester L | 50 | 75 | --- | --- | 50 | 75 | --- | --- | 50 | 75 | --- | --- | 50 | 75 | --- | --- | --- | --- | --- | --- | --- | --- | --- | --- |
| Polyester M | --- | --- | 50 | 75 | --- | --- | 50 | 75 | --- | --- | 50 | 75 | --- | --- | 50 | 75 | --- | --- | --- | --- | --- | --- | --- | --- |
| Polyester S | --- | --- | --- | --- | --- | --- | --- | --- | --- | --- | --- | --- | --- | --- | --- | --- | 50 | --- | --- | --- | --- | --- | --- | --- |
| Polyester T | --- | --- | --- | --- | --- | --- | --- | --- | --- | --- | --- | --- | --- | --- | --- | --- | --- | 50 | --- | --- | --- | --- | --- | --- |
| Polyester R | --- | --- | --- | --- | --- | --- | --- | --- | --- | --- | --- | --- | --- | --- | --- | --- | --- | --- | 50 | --- | --- | --- | --- | --- |
| Polyester Q | --- | --- | --- | --- | --- | --- | --- | --- | --- | --- | --- | --- | --- | --- | --- | --- | --- | --- | --- | 50 | --- | --- | --- | --- |
| Polyester U | --- | --- | --- | --- | --- | --- | --- | --- | --- | --- | --- | --- | --- | --- | --- | --- | --- | --- | --- | --- | 50 | --- | --- | --- |
| Polyester H | --- | --- | --- | --- | --- | --- | --- | --- | --- | --- | --- | --- | --- | --- | --- | --- | --- | --- | --- | --- | --- | 50 | --- | --- |
| Polyester O | --- | --- | --- | --- | --- | --- | --- | --- | --- | --- | --- | --- | --- | --- | --- | --- | --- | --- | --- | --- | --- | --- | 50 | --- |
| Polyester V | --- | --- | --- | --- | --- | --- | --- | --- | --- | --- | --- | --- | --- | --- | --- | --- | --- | --- | --- | --- | --- | --- | --- | 50 |
| t-Butyl perbenzoate | .25 | .25 | .25 | .25 | .5 | .5 | .5 | .5 | --- | --- | --- | --- | --- | --- | --- | --- | .5 | .5 | .5 | .5 | .5 | .5 | .5 | .5 |
| Benzoyl peroxide | --- | --- | --- | --- | --- | --- | --- | --- | .25 | .25 | .25 | .25 | .5 | .5 | .5 | .5 | --- | --- | --- | --- | --- | --- | --- | --- |
| Lead stearate | .5 | .5 | .5 | .5 | .5 | .5 | .5 | .5 | .5 | .5 | .5 | .5 | .5 | .5 | .5 | .5 | .5 | .5 | .5 | .5 | .5 | .5 | .5 | .5 |
| Bisphenol A | .25 | --- | --- | .25 | --- | .25 | .25 | --- | --- | .25 | .25 | --- | --- | .25 | .25 | --- | --- | --- | --- | --- | --- | --- | --- | --- |

Several of the resinous compositions set forth in Table II were pressure molded for 3 minutes at 325° F. The finished products were then tested for various physical properties. The test procedures are hereinafter described, and the results obtained are listed in Table III.

Hardness—A Shore Durometer Hardness Tester was employed, and the "D" scale was used. The specimen tested was of 80 mils thickness, and the spring loaded penetrator was held down for 10 seconds.

Volatility _____A.S.T.M. D-1203-55
Kerosene extraction _____A.S.T.M. D-1239-55

Humidity—Compatibility—This was determined on the basis of the amount of exudation which occurred after aging in a water vapor saturated atmosphere for two weeks at 60° C. Values are employed from 1 to 4 in order of increasing exudation.

Tensile strength _____A.S.T.M. D-882-56T except that the dumbell was of 40 mils thickness and measured 50 mils by 500 mils. The rate of loading was 2 inches per minute. Break p.s.i. was recorded.

Table III

| Composition No. | Hardness | Volatility | Kerosene extraction | Humidity compatibility | Tensile strength |
|---|---|---|---|---|---|
| 1 | 45 | 1.3 | 0.85 | 2 | 2,973 |
| 2 | 27 | 1.2 | 1.06 | 3 | 1,910 |
| 3 | 56 | 1.1 | 0.62 | 1 | 3,520 |
| 4 | 31 | 1.2 | 0.78 | 2 | 2,786 |
| 5 | 46 | 1.3 | 0.23 | 2 | 3,080 |
| 6 | 31 | 1.2 | 0.52 | 2 | 2,237 |
| 7 | 64 | 0.8 | 0.44 | 1 | 4,423 |
| 8 | 34 | 1.1 | 0.67 | 1 | 2,733 |
| 9 | 45 | 1.3 | 0.75 | 3 | 2,817 |
| 10 | 25 | 1.2 | 1.30 | 4 | 1,947 |
| 11 | 45 | 1.1 | 0.70 | 1 | 3,353 |
| 12 | 25 | 1.1 | 0.69 | 2 | 2,150 |
| 13 | 44 | 1.3 | 0.66 | 4 | 2,800 |
| 14 | 27 | 1.3 | 1.41 | 3 | 1,997 |
| 15 | 48 | 1.1 | 0.58 | 1 | 3,220 |
| 16 | 32 | 1.1 | 0.85 | 1 | 2,407 |
| 17 | 81 | 0.6 | 0.29 | 1 | --- |
| 18 | 78 | 0.8 | 0.34 | 1 | --- |
| 19 | 78 | 0.5 | 0.25 | 1 | --- |
| 20 | 75 | 1.2 | 0.42 | 3 | --- |
| 21 | 73 | 0.9 | 0.58 | 1 | --- |
| 22 | 65 | 0.9 | 0.54 | 1 | --- |
| 23 | 71 | 0.9 | 0.49 | 1 | --- |
| 24 | 50 | 1.9 | 1.45 | 1 | --- |

Results similar to those detailed above are obtained when other and different low-molecular weight, terminated, unsaturated polyesters of this invention are employed in preparing the resinous compositions. Such other and different polyesters include the following:

Table IV

| Glycol | Dicarboxylic acids | | | Terminating acid(s) | Average number of recurring units |
|---|---|---|---|---|---|
| | Saturated | Unsaturated | Ratio of s:u | | |
| Diethylene | Succinic | Fumaric | 2:1 | Myristic | 10 |
| Dipropylene | Glutaric | Itaconic | 1:2 | Stearic | 12 |
| Ethylene | Adipic | Citraconic | 3:1 | Capric | 10 |
| 1,4-pentanediol | Azelaic | Fumaric | 1:1 | Caprioc | 6 |
| 2,2-dimethypropane-1,3-diol | Adipic | Maleic | 2:1 | Caprylic | 4 |
| 1,6-hexanediol | ___do___ | Fumaric | 2:1 | Capric | 12 |
| 2-methyl-2,4-pentanediol | Pimelic | Itaconic | 2:1 | Lauric | 14 |
| 1,3-butylene | Adipic | Citraconic | 1:1 | Oleic | 2 |
| 1,2-propylene | ___do___ | Maleic | 1:1 | Stearic and caproic [1] | 10 |
| 1,3-butylene | Glutaric | Fumaric | 2:1 | Linoleic | 12 |
| Dipropylene | Adipic | Maleic | 3:1 | Benzoic | 4 |
| 1,3-butylene | Succinic | Itaconic | 3:1 | Decylenic | 8 |
| Diethylene | ___do___ | Fumaric | 2:1 | Lauryl | 12 |
| Dipropylene | Glutaric | Itaconic | 1:2 | t-Butyl | 6 |
| Ethylene | Adipic | Citraconic | 3:1 | Benzyl | 4 |
| 1,4-pentanediol | Azelaic | Fumaric | 1:1 | n-Octyl | 14 |
| 2,2-dimethylpropane-3,3-diol | Adipic | Maleic | 2:1 | Cetyl | 16 |
| 1,6-hexanediol | ___do___ | Fumaric | 2:1 | Phenoxyethyl | 10 |
| 2-methyl-2,4-pentanediol | Pimelic | Itaconic | 2:1 | Phenylbutyl | 10 |
| 1,3-butylene | Adipic | Citraconic | 1:1 | Myristyl | 10 |
| 1,2-propylene | ___do___ | Maleic | 1:1 | Isoamyl | 2 |
| 1,3-butylene | Glutaric | Fumaric | 2:1 | n-Hexyl | 12 |
| Dipropylene | Adipic | Maleic | 3:1 | Neopentyl | 8 |
| 1,3-butylene | Succinic | Itaconic | 3:1 | Phenoxybutyl | 4 |

[1] Ratio of stearic to caprioc—1:1.

Numerous resinous compositions comprising a halogen-containing vinyl resin, a polymerizable polyester plasticizer, and either or both a non-polymerizable plasticizer and a cross linking agent were prepared. The components of such compositions are set forth in Table V.

Table V

| Components | Composition No. (parts by weight) | | | | | | | | | | | | | | | | | |
|---|---|---|---|---|---|---|---|---|---|---|---|---|---|---|---|---|---|---|
| | 25 | 26 | 27 | 28 | 29 | 30 | 31 | 32 | 33 | 34 | 35 | 36 | 37 | 38 | 39 | 40 | 41 | 42 |
| Polyvinyl chloride | 100 | 100 | 100 | 100 | 100 | 100 | 100 | 100 | 100 | 100 | 100 | 100 | 100 | 100 | 100 | 100 | 100 | 100 |
| Polyester A | 35 | | | | | | | | | | | | | | | | | |
| Polyester D | | 40 | 40 | 20 | 20 | 50 | 50 | 70 | 70 | 70 | 70 | 60 | 60 | 60 | 60 | 60 | 60 | 60 |
| Vinyl toluene | | | | | | | | 10 | 10 | | | | | | | | | |
| Diallyl phthalate | 5 | | | | | | | | | | | | | | | | | |
| Triallyl citrate | | 4 | 4 | | 10 | | | | | | | | | | | | | |
| Di-(2-ethylhexyl)phthalate | | | | 60 | 50 | | | | | | | | | | | | | |
| Diallyl sebacate | | | | | | 30 | 30 | | | | | | | | | | | |
| Divinyl toluene | | | | | | | | | | 10 | 10 | | | | | | | |
| Vinyl benzoate | | | | | | | | | | | | 20 | 20 | | | | | |
| Bis(β-chloroethyl)vinyl phosphonate | | | | | | | | | | | | | | 20 | | | | |
| Diallyl adipate | | | | | | | | | | | | | | | 20 | | | |
| 1-cyanovinyl acetate | | | | | | | | | | | | | | | | 20 | | |
| Vinyl crotonate | | | | | | | | | | | | | | | | | 20 | |
| n-Butyl vinyl ether | | | | | | | | | | | | | | | | | | 20 |
| t-Butyl perbenzoate | | | .5 | 1 | 1.5 | | .2 | | .5 | | .5 | | | | .2 | .1 | .1 | .1 |
| Benzoyl peroxide | .5 | .5 | | | | | | | | | | | .1 | .1 | | | | |

While this invention has been described with respect to certain embodiments, it is not so limited and it is to be understood that variations and modifications thereof may be made without departing from the spirit or scope of this invention.

The embodiments of the invention in which an exclusive property or privilege is claimed are defined as follows:

1. A composition of matter comprising a vinyl halide polymer selected from the group consisting of polymerized vinyl halide monomers and the copolymers of such monomers with an ethylenically unsaturated monomer, at least 50% of the monomer units of said copolymers being vinyl halide units, and a terminated, unsaturated polyester consisting essentially of the residues of a dihydroxy aliphatic compound of from 2 to 6 carbon atoms, a monoolefinically unsaturated, aliphatic dicarboxylic acid of from 4 to 5 carbon atoms, and a saturated, aliphatic dicarboxylic acid of from 4 to 10 carbon atoms, said polyester being terminated with a residue selected from the group consisting of the residues of monocarboxylic saturated and unsaturated aliphatic acids of from 6 to 20 carbon atoms, benzoic acid, naphthoic acid, saturated aliphatic alcohols of from 4 to 20 carbon atoms and phenylalkyl and phenoxyalkyl alcohols of from 7 to 10 carbon atoms, the ratio of saturated to unsaturated dicarboxylic acid residues being from 1:3 to 8:1.

2. A composition as defined in claim 1 wherein the polyester is present in amounts of from 5 to 200 parts by weight per 100 parts by weight of vinyl halide polymer.

3. A composition of matter comprising a vinyl halide polymer selected from the group consisting of polymerized vinyl halide monomers and the copolymers of such monomers with an ethylenically unsaturated monomer, at least 50% of the monomer units of said copolymers being vinyl halide units, and a terminated, unsaturated polyester of the formula

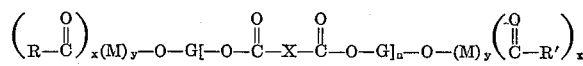

wherein:
n is an integer from 2 to 20;
each X is selected from the group consisting of saturated aliphatic hydrocarbons of from 2 to 8 carbon atoms and mono-olefinically unsaturated aliphatic hydrocarbons of from 4 to 5 carbon atoms, the ratio of saturated to unsaturated hydrocarbons represented by X being from 1:3 to 8:1;

G is selected from the group consisting of alkylene and oxyalkylene of from 2 to 6 carbon atoms;
R and R' are each selected from the group consisting of alkyl and alkenyl of from 5 to 19 carbon atoms, phenyl and naphthyl;
M is selected from alkyl of from 4 to 20 carbon atoms, and phenylalkyl and phenoxyalkyl of from 7 to 10 carbon atoms; and
x and y are unlike integers selected from 0 and 1.

4. A composition as defined in claim 3 wherein the polyester is present in amounts of from 5 to 200 parts by weight per 100 parts by weight of vinyl halide polymer.

5. A composition of matter comprising a vinyl chloride polymer selected from the group consisting of polymerized vinyl chloride monomers and the copolymers of such monomers with an ethylenically unsaturated monomer, at least 50% of the monomer units of said copolymers being vinyl chloride units, and a terminated, unsaturated polyester consisting essentially of the residues of a dihydroxy aliphatic compound of from 2 to 6 carbon atoms, a monoolefinically unsaturated, aliphatic dicarboxylic acid of from 4 to 5 carbon atoms, and a saturated, aliphatic dicarboxylic acid of from 4 to 10 carbon atoms, said polyester being terminated with a residue selected from the group consisting of the residues of monocarboxylic saturated and unsaturated aliphatic acids of from 6 to 20 carbon atoms, benzoic acid, naphthoic acid, saturated aliphatic alcohols of from 4 to 20 carbon atoms and phenylalkyl and phenoxyalkyl alcohols of from 7 to 10 carbon atoms, the ratio of saturated to unsaturated dicarboxylic acid residues being from 1:3 to 8:1.

6. A composition as defined in claim 5 wherein the polyester is present in amounts of from 5 to 200 parts by weight per 100 parts by weight of vinyl chloride polymer.

7. A composition as defined in claim 5 wherein the vinyl chloride polymer is polyvinyl chloride.

8. A composition of matter comprising a vinyl chloride polymer selected from the group consisting of polymerized vinyl chloride monomers and the copolymers of such monomers with an ethylenically unsaturated monomer, at least 50% of the monomer units of said copolymers being vinyl chloride units, and a terminated, unsaturated polyester of the formula

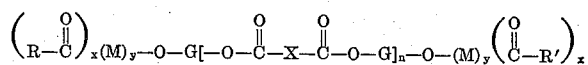

wherein:
n is an integer from 2 to 20;
each X is selected from the group consisting of saturated aliphatic hydrocarbons of from 2 to 8 carbon atoms and mono-olefinically unsaturated aliphatic hydrocarbons of from 4 to 5 carbon atoms, the ratio of saturated to unsaturated hydrocarbons represented by X being from 1:3 to 8:1;

G is selected from the group consisting of alkylene and oxyalkylene of from 2 to 6 carbon atoms;

R and R' are each selected from the group consisting of alkyl and alkenyl of from 5 to 19 carbon atoms, phenyl and naphthyl;

M is selected from alkyl of from 4 to 20 carbon atoms, and phenylalkyl and phenoxyalkyl of from 7 to 10 carbon atoms; and $x$ and $y$ are unlike integers selected from 0 and 1.

9. A composition as defined in claim 8 wherein the polyester is present in amounts of from 5 to 200 parts by weight per 100 parts by weight of vinyl chloride polymer.

10. A composition as defined in claim 8 wherein the vinyl chloride polymer is polyvinyl chloride.

11. A composition of matter comprising a vinyl halide polymer selected from the group consisting of polymerized vinyl halide monomers and the copolymers and the copolymers of such monomers with an ethylenically unsaturated monomer, at least 50% of the monomer units of said copolymers being vinyl halide units, and a terminated, unsaturated polyester of the formula

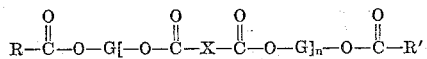

wherein:

$n$ is an integer from 6 to 16;

each X is selected from —(CH$_2$)$_4$— and —CH=CH—, the ratio of —(CH$_2$)$_4$— to —CH=CH— is from 1:2 to 3:1;

G is alkylene of from 2 to 6 carbon atoms; and

R and R' are alkyl of from 7 to 17 carbon atoms.

12. A composition as defined in claim 11 wherein the polyester is present in amounts of from 5 to 200 parts by weight per 100 parts by weight of vinyl chloride polymer.

13. A composition of matter comprising a vinyl chloride polymer selected from the group consisting of polymerized vinyl chloride monomers and the copolymers of such monomers with an ethylenically unsaturated monomer, at least 50% of the monomer units of said copolymers being vinyl chloride units, and a terminated, unsaturated polyester of the formula

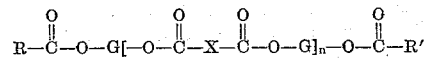

wherein:

$n$ is an integer from 6 to 16;

each X is selected from —(CH$_2$)$_4$— and —CH=CH—, the ratio of —(CH$_2$)$_4$— to —CH=CH— is from 1:2 to 3:1;

G is alkylene of from 2 to 6 carbon atoms; and

R and R' are alkyl of from 7 to 17 carbon atoms.

14. A composition as defined in claim 13 wherein the polyester is present in amounts of from 5 to 200 parts by weight per 100 parts by weight of vinyl chloride polymer.

15. A composition as defined in claim 13 wherein the vinyl chloride polymer is polyvinyl chloride.

16. A composition of matter comprising polyvinyl chloride and a terminated, unsaturated polyester consisting essentially of the residues of an alkylene glycol of from 2 to 6 carbon atoms, adipic acid and fumaric acid, said polyester being terminated with the residue of a saturated, aliphatic, monocarboxylic acid of from 8 to 18 carbon atoms, the ratio of adipic acid residues to fumaric acid residues being from 1:2 to 3:1, said polyester being present in amounts of from 5 to 200 parts by weight per 100 parts by weight of polyvinyl chloride.

17. A composition of matter comprising a vinyl halide polymer selected from the group consisting of polymerized vinyl halide monomers and the copolymers of such monomers with an ethylenically unsaturated monomer, at least 50% of the monomer units of said copolymers being vinyl halide units, a terminated, unsaturated polyester of the formula

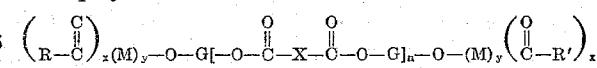

wherein:

$n$ is an integer from 2 to 20;

each X is selected from the group consisting of saturated aliphatic hydrocarbons of from 2 to 8 carbon atoms and mono-olefinically unsaturated aliphatic hydrocarbons from 4 to 5 carbon atoms, the ratio of saturated to unsaturated hydrocarbons represented by X being from 1:3 to 8:1;

G is selected from the group consisting of alkylene and oxyalkylene of from 2 to 6 carbon atoms;

R and R' are each selected from the group consisting of alkyl and alkenyl of from 5 to 19 carbon atoms, phenyl and naphthyl;

M is selected from alkyl of from 4 to 20 carbon atoms, and phenylalkyl and phenoxyalkyl of from 7 to 10 carbon atoms; and $x$ and $y$ are unlike integers selected from 0 and 1; and an ester selected from the group consisting of alkyl and aryl phosphates, alkyl phthalates, alkyl adipates, alkyl sebacates, alkyl azelates and epoxidized vegetable oils, the combined amount of polyester and ester being from 5 to 200 parts by weight per 100 parts by weight of vinyl halide polymer.

18. A composition as defined in claim 17 wherein the ester is an alkyl phthalate.

19. A composition as defined in claim 18 wherein the vinyl halide polymer is a vinyl chloride polymer.

20. A composition as defined in claim 19 wherein the alkyl phthalate is di-(2-ethylhexyl)phthalate.

21. A composition of matter comprising a vinyl halide polymer selected from the group consisting of polymerized vinyl halide monomers and the copolymers of such monomers with an ethylenically unsaturated monomer, at least 50% of the monomer units of said copolymers being vinyl halide units, a terminated, unsaturated polyester of the formula

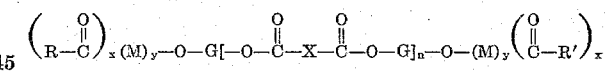

wherein:

$n$ is an integer from 2 to 20;

each X is selected from the group consisting of saturated aliphatic hydrocarbons of from 2 to 8 carbon atoms and mono-olefinically unsaturated aliphatic hydrocarbons of from 4 to 5 carbon atoms, the ratio of saturated to unsaturated hydrocarbons represented by X being from 1:3 to 8:1;

G is selected from the group consisting of alkylene and oxyalkylene of from 2 to 6 carbon atoms;

R and R' are each selected from the group consisting of alkyl and alkenyl of from 5 to 19 carbon atoms, phenyl and naphthyl;

M is selected from alkyl of from 4 to 20 carbon atoms, and phenylalkyl and phenoxyalkyl of from 7 to 10 carbon atoms; and $x$ and $y$ are unlike integers selected from 0 and 1; and a compound selected from the group consisting of vinyl and polyallyl esters, the ratio of polyesters to compound being at least 2:1.

22. A composition as defined in claim 21, the combined amount of polyester and compound being from 5 to 200 parts by weight per 100 parts by weight of vinyl halide polymer.

23. A composition as defined in claim 22 wherein the compound is a polyallyl ester.

24. A composition as defined in claim 23 wherein the vinyl halide polymer is polyvinyl chloride.

25. A composition as defined in claim 24 wherein the polyallyl ester is diallyl adipate.

26. A composition as defined in claim 24 wherein the polyallyl ester is diallyl phthalate.

27. A composition of matter comprising a vinyl halide polymer selected from the group consisting of polymerized vinyl halide monomers and the copolymers of such monomers with an ethylenically unsaturated monomer, at least 50% of the monomer units of said copolymers being vinyl halide units, a terminated, unsaturated polyester of the formula

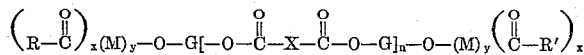

wherein:
- $n$ is an integer from 2 to 20;
- each X is selected from the group consisting of saturated aliphatic hydrocarbons of from 2 to 8 carbon atoms and mono-olefinically unsaturated aliphatic hydrocarbons of from 4 to 5 carbon atoms, the ratio of saturated to unsaturated hydrocarbons represented by X being from 1:3 to 8:1;
- G is selected from the group consisting of alkylene and oxyalkylene of from 2 to 6 carbon atoms;
- R and R' are each selected from the group consisting of alkyl and alkenyl of from 5 to 19 carbon atoms, phenyl and naphthyl;
- M is selected from alkyl of from 4 to 20 carbon atoms, and phenylalkyl and phenoxyalkyl of from 7 to 10 carbon atoms; and
- $x$ and $y$ are unlike integers selected from 0 and 1; and an ester selected from the group consisting of alkyl and aryl phosphates, alkyl phthalates, alkyl adipates, alkyl sebacates, alkyl azelates and epoxidized vegetable oils, and a compound selected from the group consisting of vinyl and polyallyl esters, the ratio of the polyester to the compound being at least 2:1, and the combined amount of polyester, ester and compound being from 5 to 200 parts by weight per 100 parts by weight of vinyl halide polymer.

28. A composition as defined in claim 27 wherein the ester is di-(2-ethylhexyl)phthalate and the compound is diallyl adipate.

29. A composition of matter comprising a vinyl chloride polymer selected from the group consisting of polymerized vinyl chloride monomers and the copolymers of such monomers with an ethylenically unsaturated monomer, at least 50% of the monomer units of said copolymers being vinyl chloride units, a terminated, unsaturated polyester of the formula

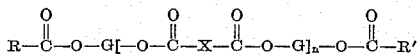

wherein:
- $n$ is an integer from 6 to 16;
- each X is selected from $-(CH_2)_4-$ and $-CH=CH-$, the ratio of $-(CH_2)_4-$ to $-CH=CH-$ is from 1:2 to 3:1;
- G is alkylene of from 2 to 6 carbon atoms; and
- R and R' are alkyl of from 7 to 17 carbon atoms; and an ester selected from the group consisting of alkyl and aryl phosphates, alkyl phthalates, alkyl adipates, alkyl sebacates, alkyl azelates and epoxidized vegetable oils, the combined amount of polyester and ester being from 5 to 200 parts by weight per 100 parts by weight of vinyl halide polymer 30. A composition as defined in claim 29 wherein said ester is di-(2-ethylhexyl)phthalate.

References Cited in the file of this patent

UNITED STATES PATENTS 2,723,286   Young et al.  ----------- Nov. 8, 1955
2,744,877   Smith  ------------------ May 8, 1956